July 25, 1967 W. G. MIDNIGHT 3,332,207
CARTON FORMING, FILLING AND SEALING MACHINE
Filed Dec. 11, 1963 12 Sheets-Sheet 6
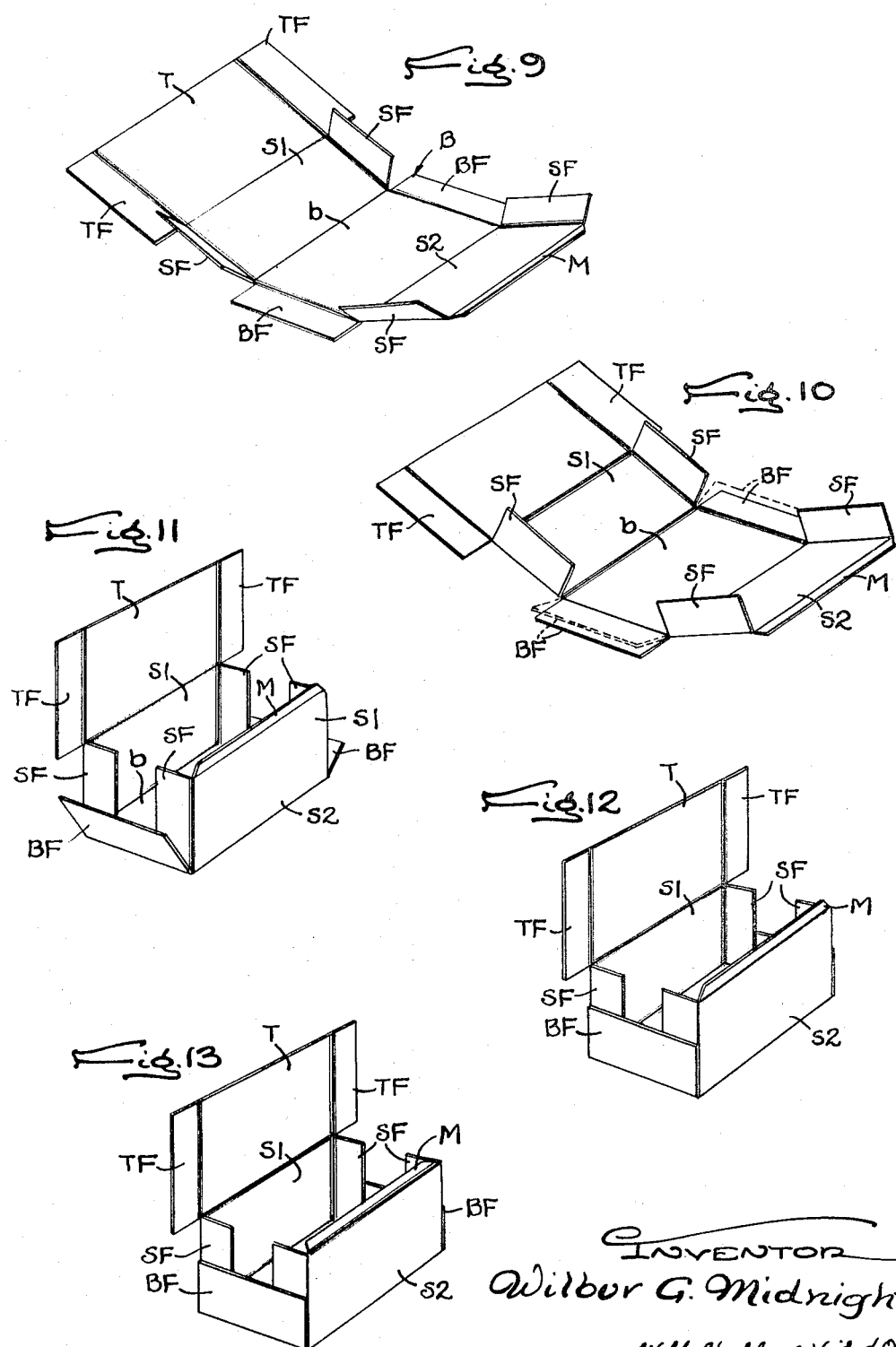

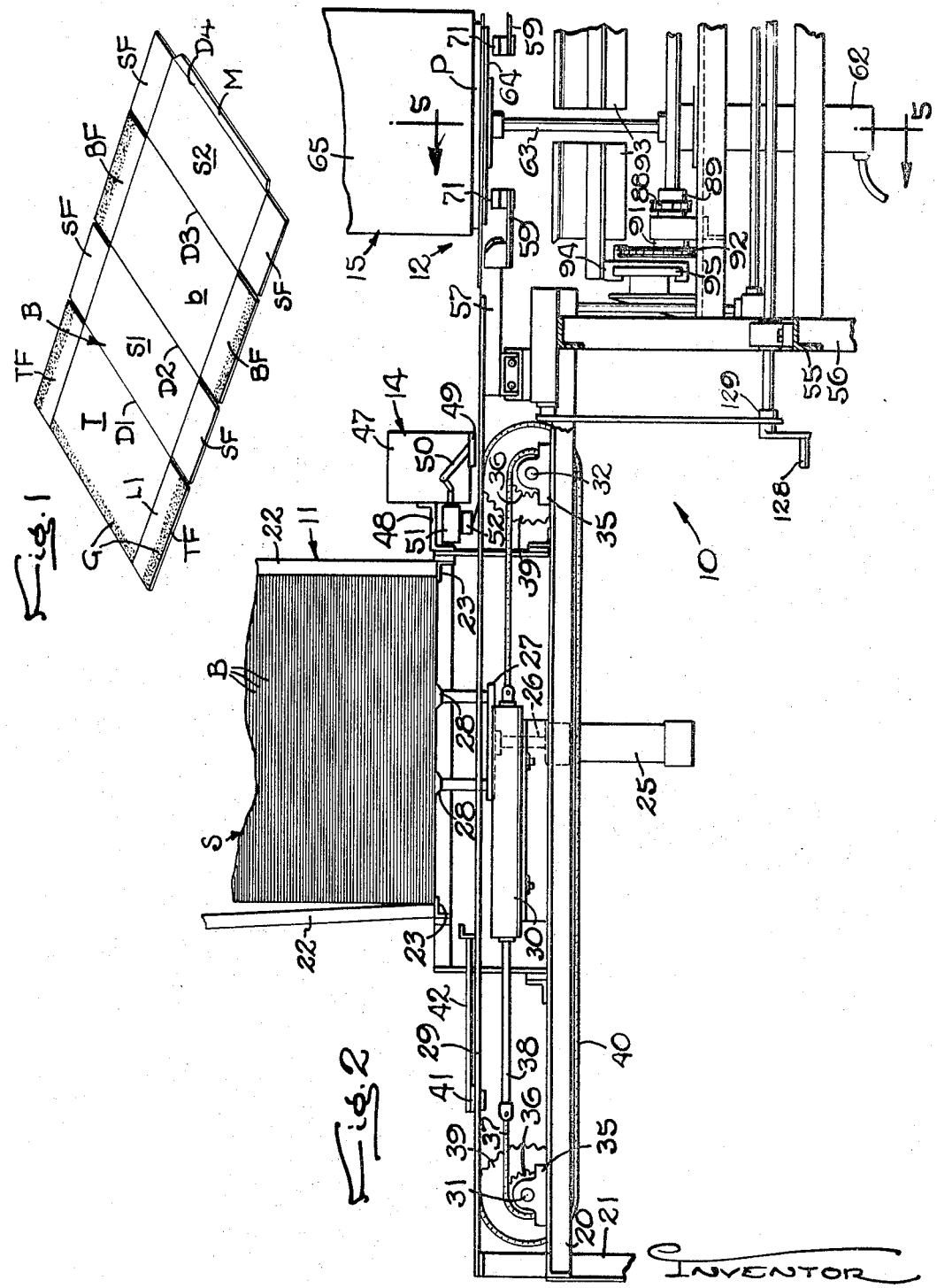

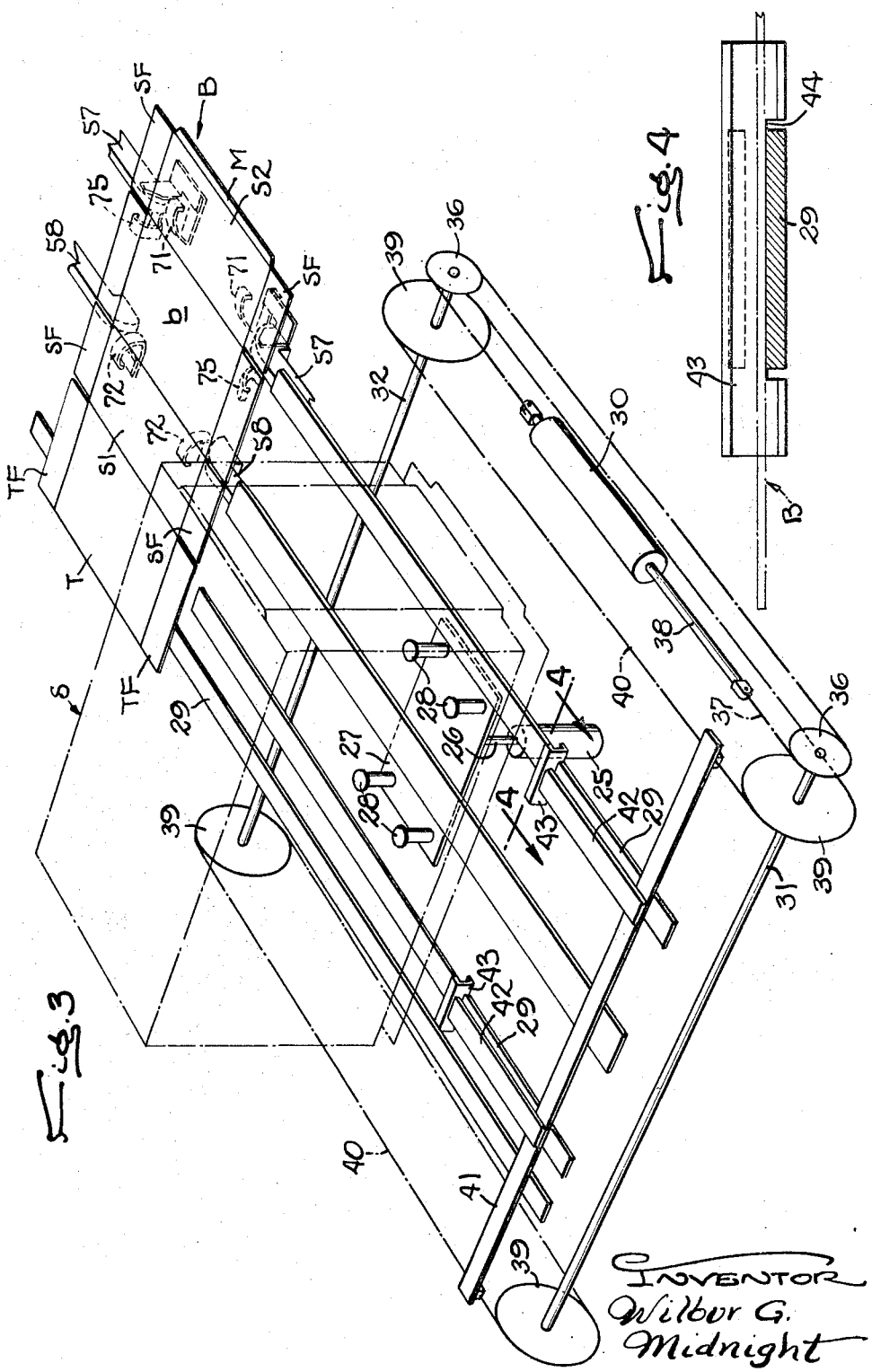

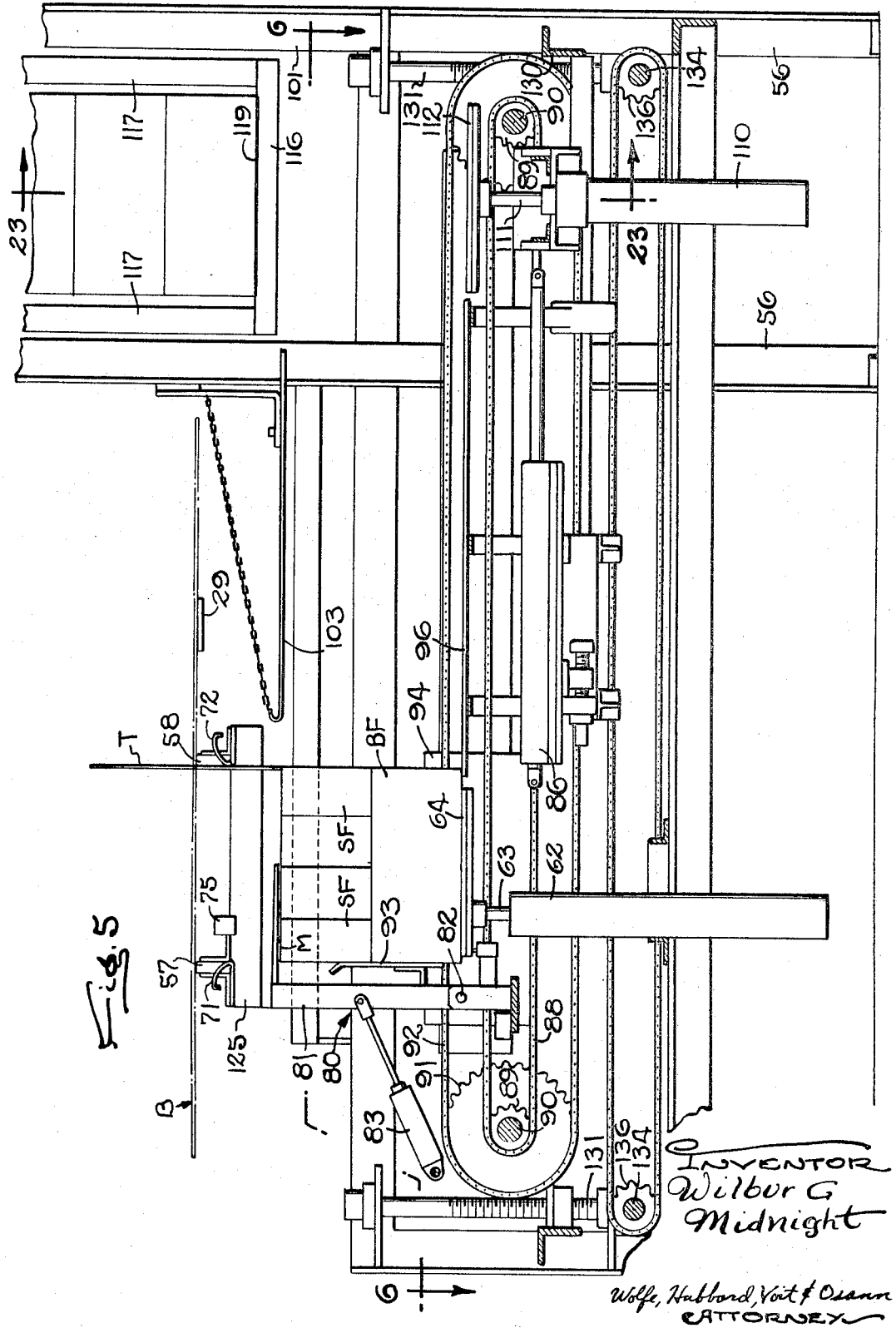

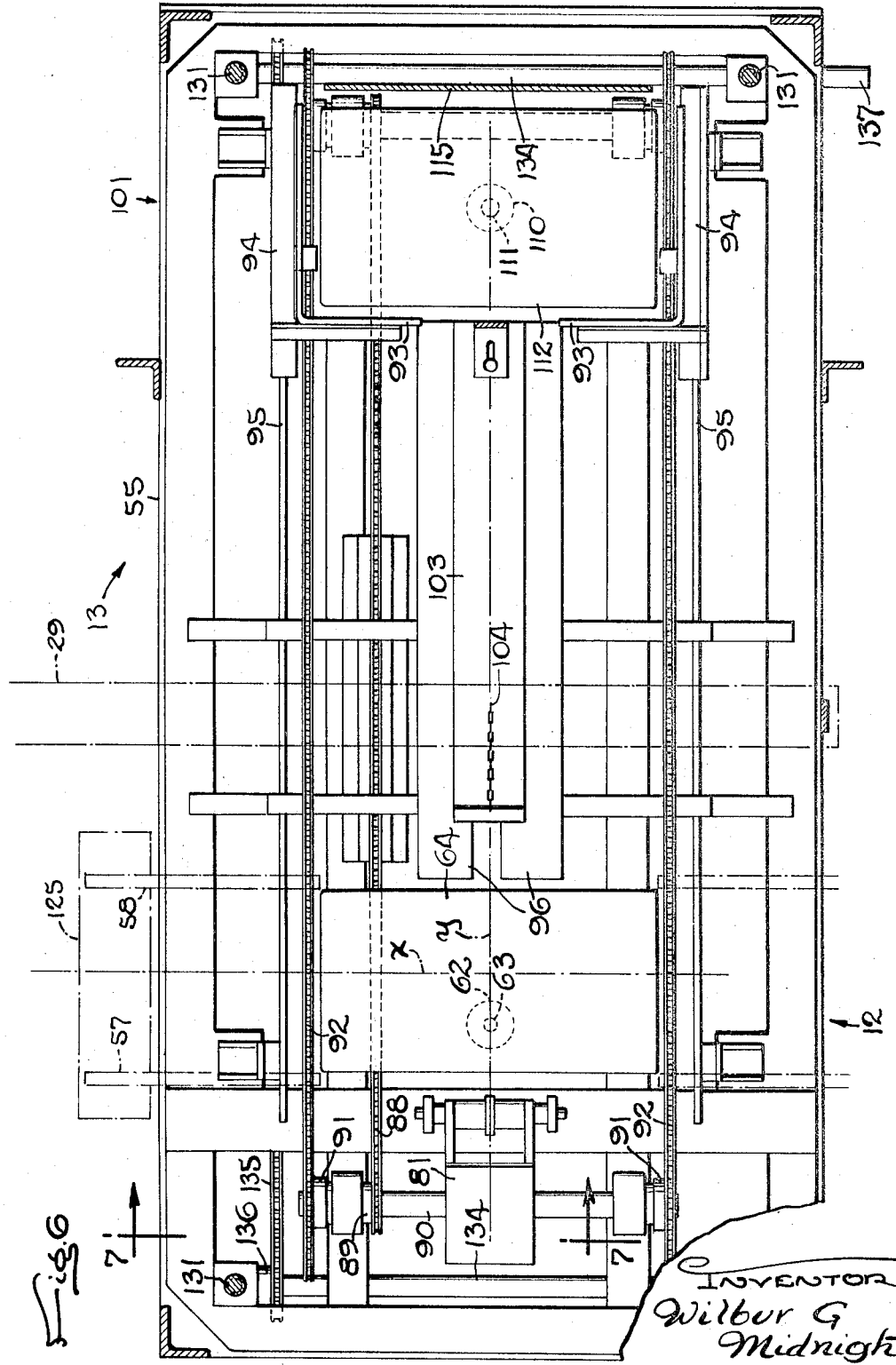

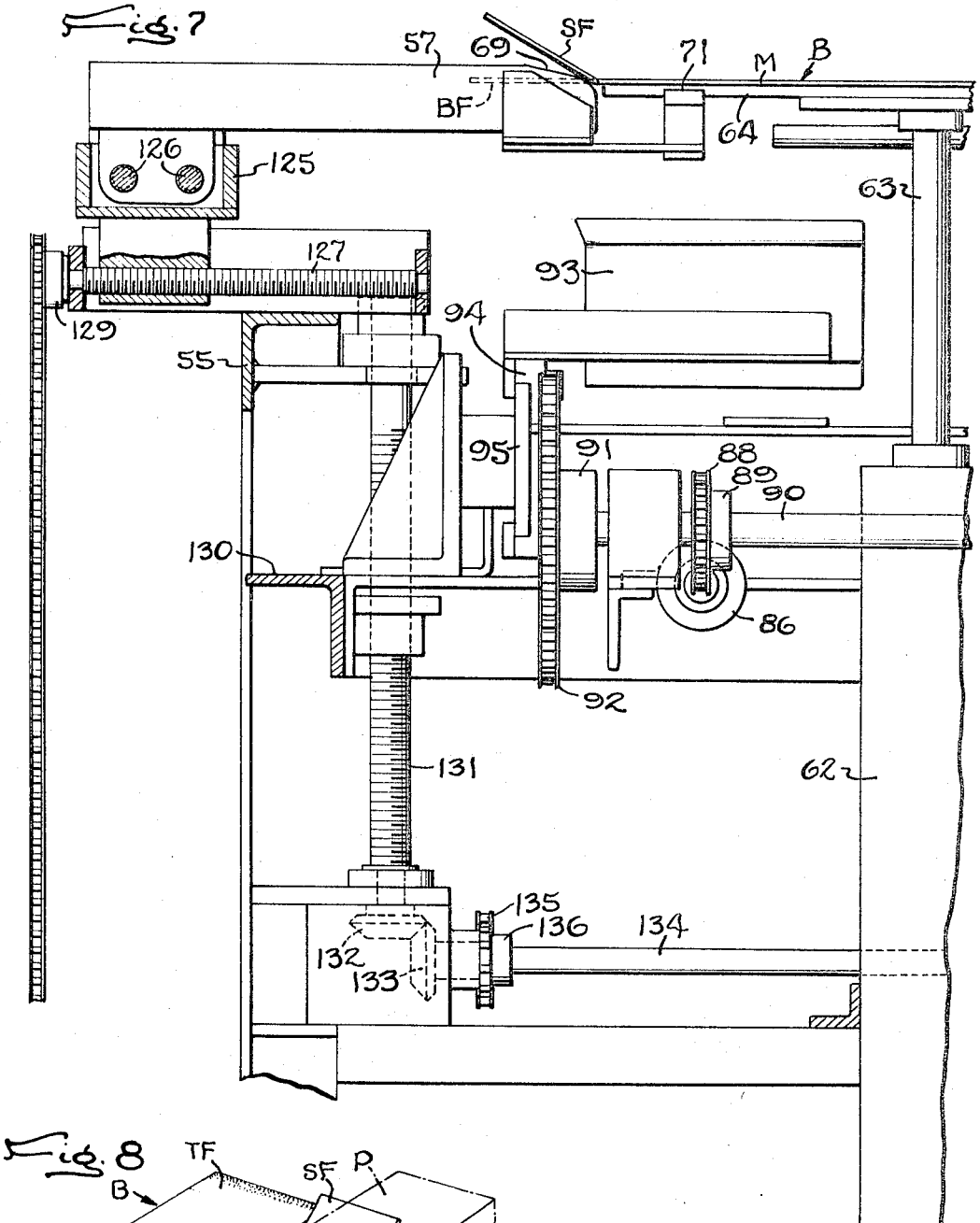

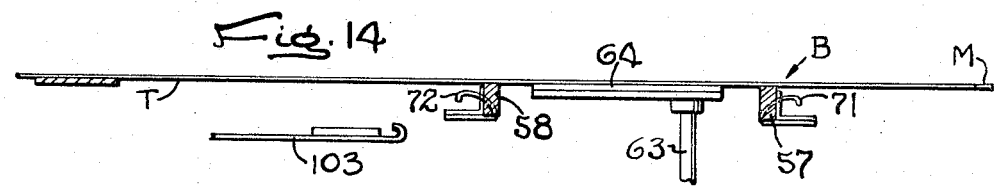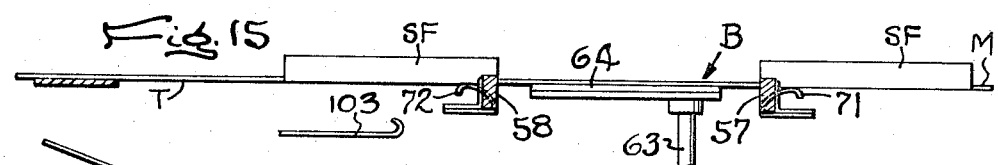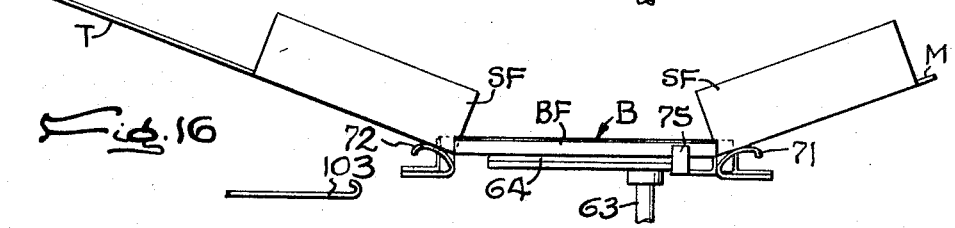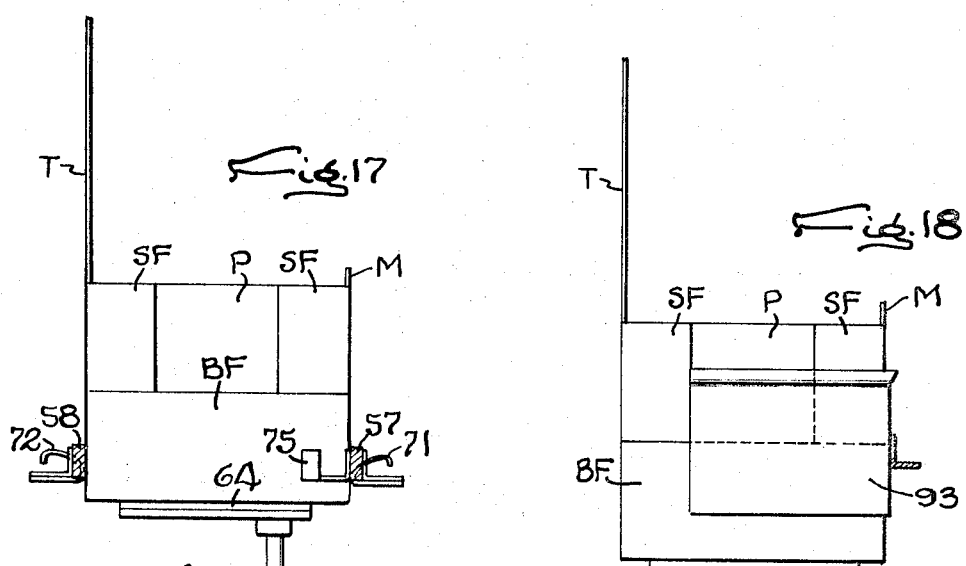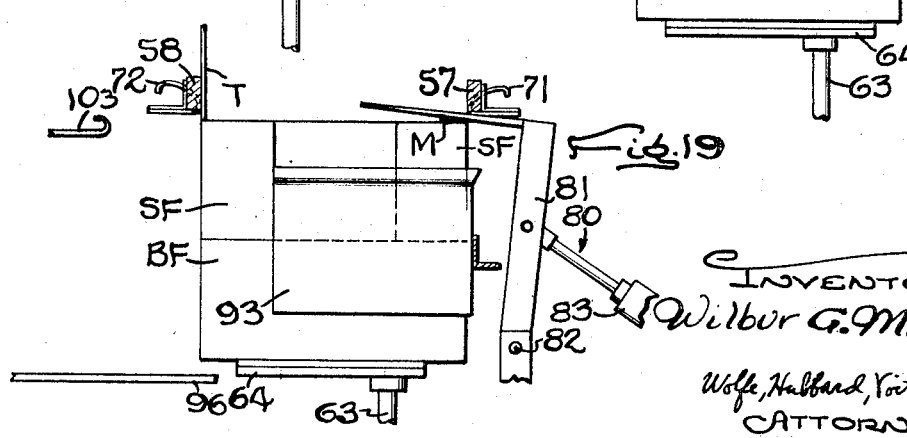

July 25, 1967 W. G. MIDNIGHT 3,332,207
CARTON FORMING, FILLING AND SEALING MACHINE
Filed Dec. 11, 1963 12 Sheets-Sheet 8
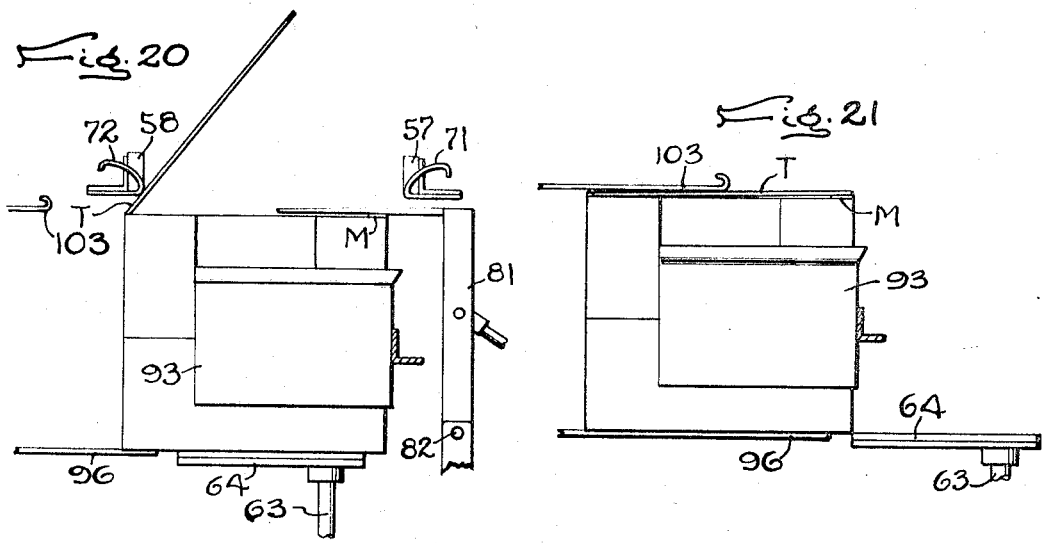
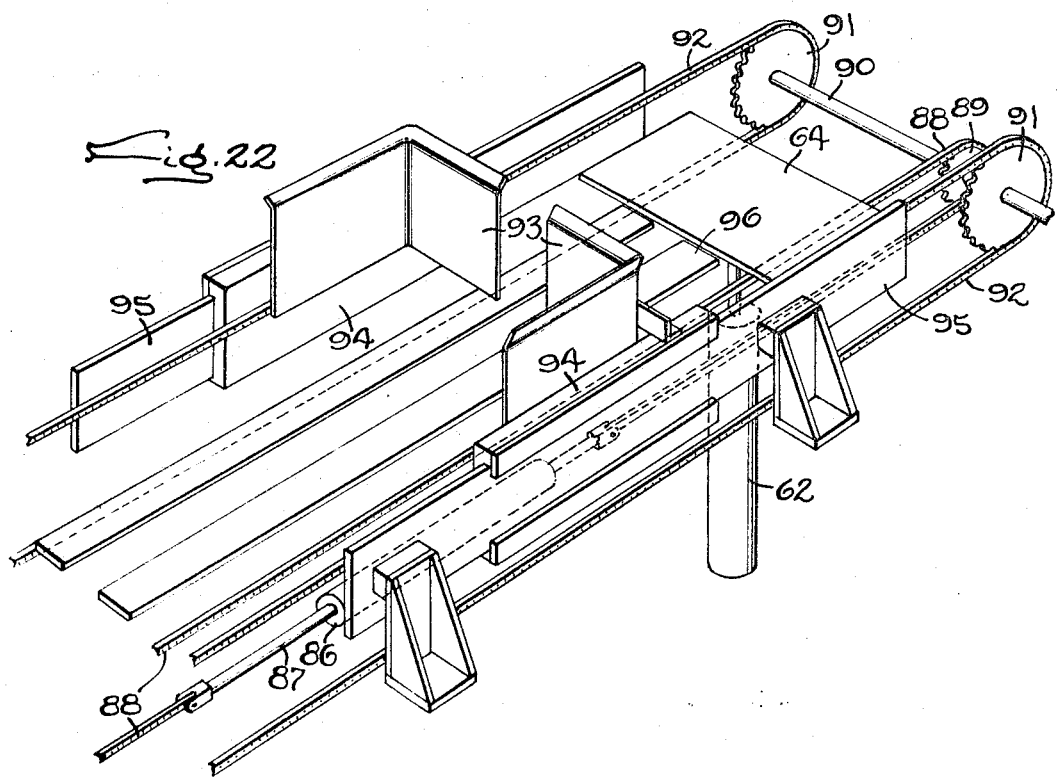
INVENTOR
Wilbur G. Midnight
Wolfe, Hubbard, Voit & Osann
ATTORNEY

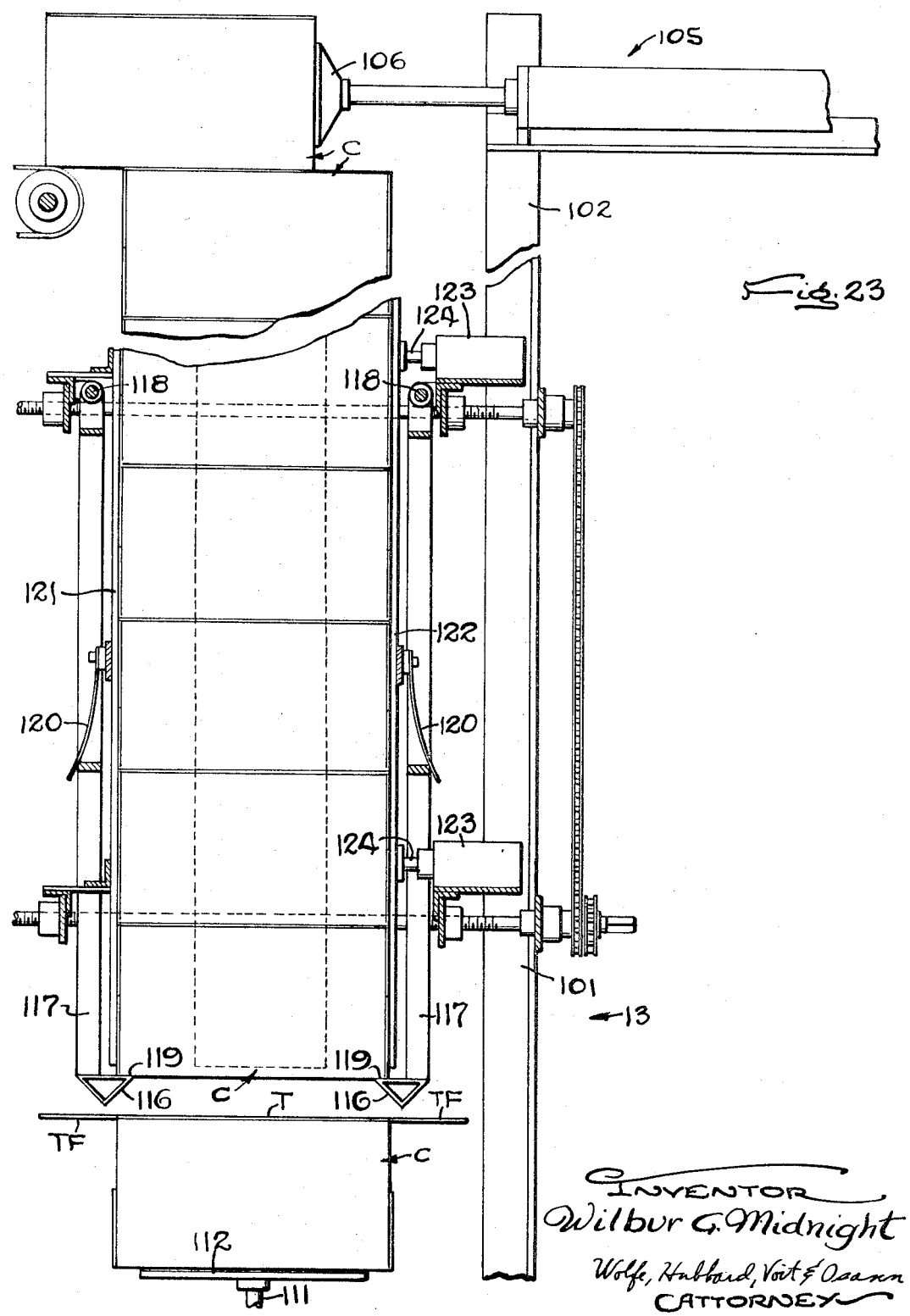

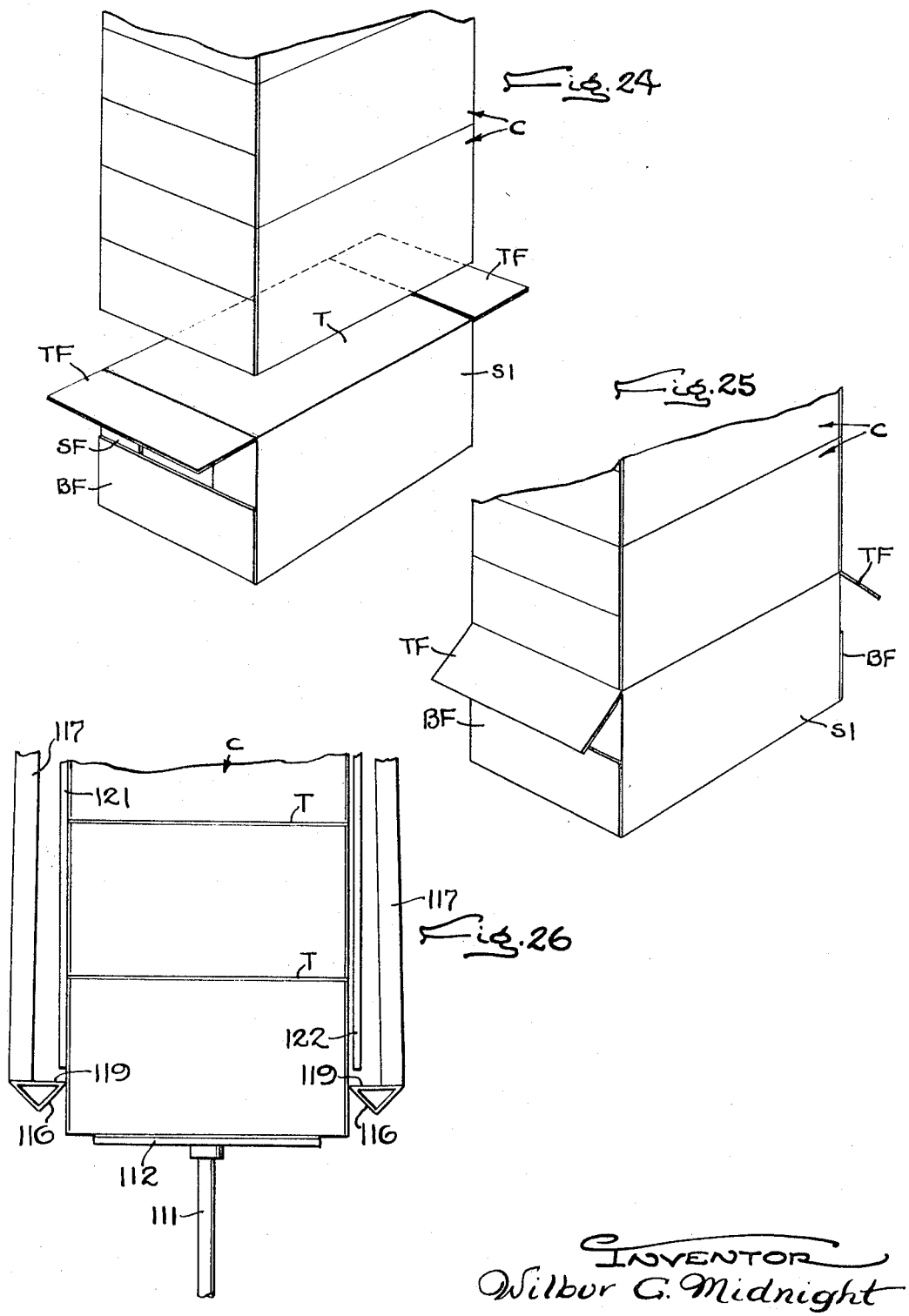

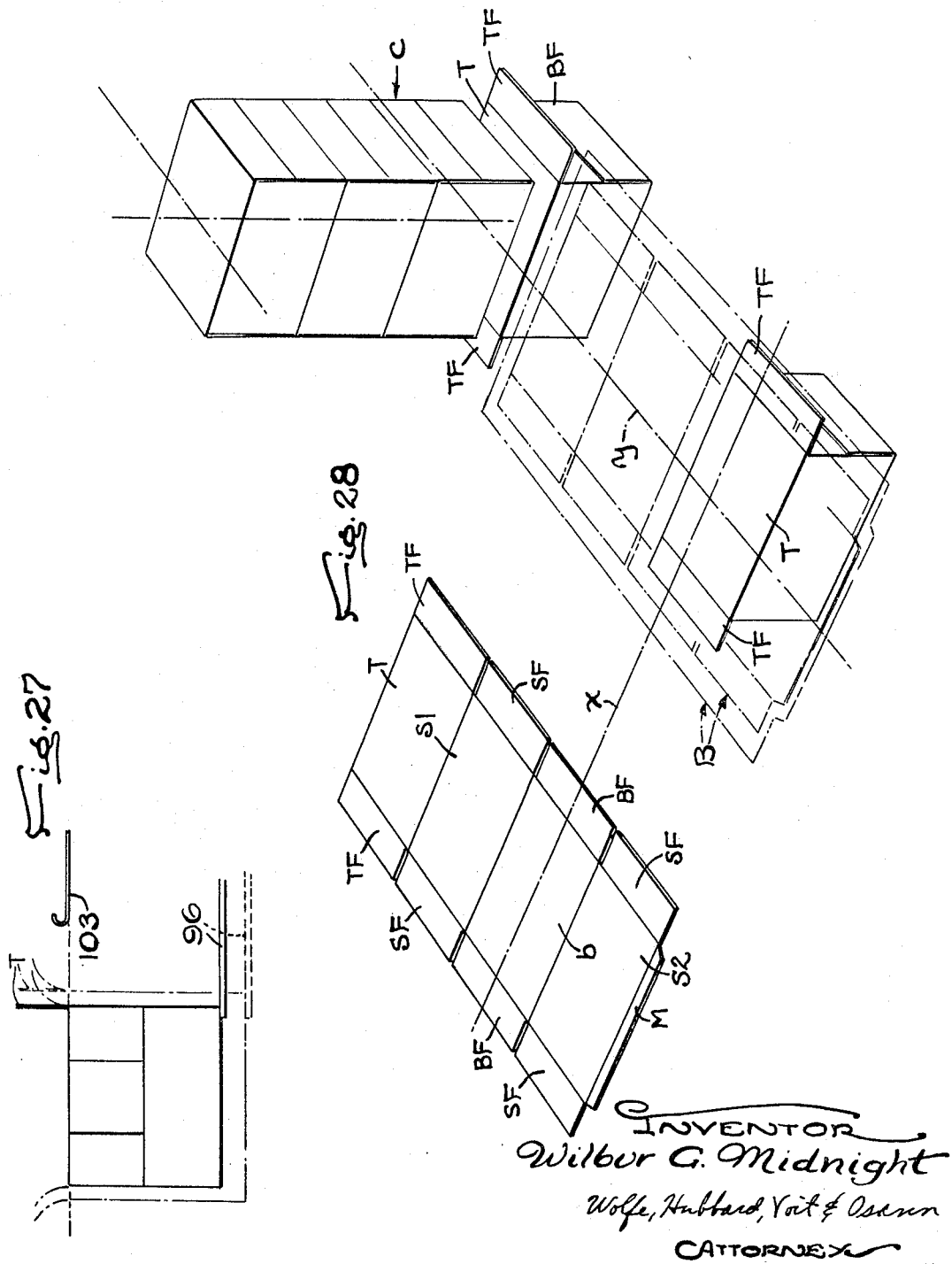

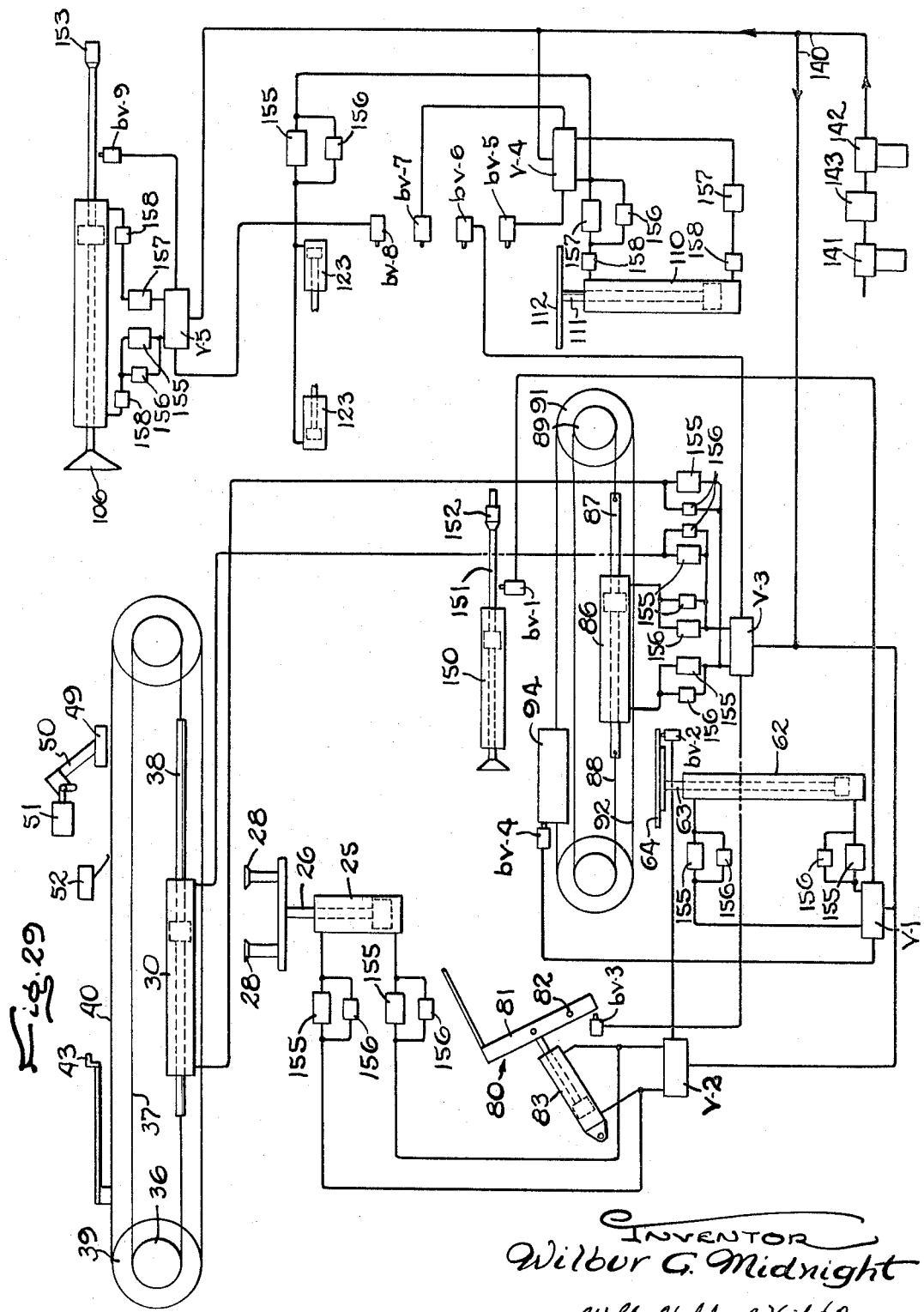

United States Patent Office 3,332,207
Patented July 25, 1967

3,332,207
CARTON FORMING, FILLING AND SEALING MACHINE
Wilbur G. Midnight, Ogden Dunes, Ind.; Margaret C. Midnight, executrix of said Wilbur G. Midnight, deceased, assignor to H. G. Weber and Company, Inc., Kiel, Wis., a corporation of Wisconsin
Filed Dec. 11, 1963, Ser. No. 329,812
13 Claims. (Cl. 53—207)

The present invention relates generally to packaging machines, and more particularly concerns machines for forming, filling and sealing carton blanks into box-like containers tightly encompassing the goods packaged therein.

In many manufacturing and processing plants, the goods or articles being produced are individually packaged in convenient containers of suitable size and description to preserve and maintain the quality and integrity of the goods until the containers are opened by the ultimate consumers. For the purposes of this discussion, containers such as: fruit jars, soup cans and cereal boxes may be considered as exemplary. These consumer size containers are generally rather small and, accordingly, larger shipping cases are usually employed for transporting the goods from the plant or factory to a convenient distribution point such as a retail store.

For making such shipping cases, corrugated boxboard has become widely accepted in the packaging industry. This material is relatively inexpensive and easy to work with and yet is strong and durable enough, if properly used, to protect the goods during transit. Typically, the boxboard is fabricated at the paper mill or boxboard plant into flat carton blanks suitably creased and slotted to facilitate formation into shipping cases at a later time. In this way, large stacks of the flat carton blanks can be bound together for shipment to the article manufacturing plants.

At the manufacturing plant, these carton blanks are then usually "set up" or formed into boxes open at the top or one end. As the goods are produced, the individual packages are consolidated into groups for placement into the open boxes. After the goods are inserted, the remaining end or top of the box is then closed and sealed. In a conventional operation, individual machines are used for forming the blanks into open cartons, for filling the open cartons with goods and for sealing the filled cartons.

Such preformed open cartons must also be constructed with sufficient internal space to permit relatively free insertion of the goods in order to prevent binding and jamming of the filling mechanism. However, even this small amount of free space within the cartons is undesirable, particularly in the case of glass containers, because it permits the goods to shift slightly as the cartons are handled and breakage of the containers may occur. In this situation, separating webs are frequently required between the individual glass containers.

Accordingly, it is the primary aim of the present invention to provide an improved packaging machine which integrates the carton forming, filling and sealing operations.

A more particular object is to provide a packaging machine that forms a flat carton blank into a box-like shipping case tightly encompassing the goods packaged within the case. It is also an object to provide such a packaging machine with a carton sealing mechanism that applies positive pressure to the sides, ends and top of the case to tightly enclose the carton about the goods before and during the sealing operation.

It is a more detailed object to provide a packaging machine of the above type in which the weight of the articles to be packaged is utilized to assist in forming the carton about the articles. A related object is to place the articles to be packaged directly on the portion of the carton which becomes the bottom and to literally wrap the sides, ends and top portion of the carton blank about the articles.

Another object is to provide a packaging machine of the above type wherein the carton forming and filling mechanism is located at the intersection of the carton blank feeding path and the carton discharge path whereby cartons of different horizontal dimensions can easily be accommodated by simply adjusting the forming components along the two paths. A similar object is to provide such a machine with means for adjusting the height of the discharge path whereby cartons of different vertical dimensions can be formed.

A further object is to provide means associated with the forming and sealing mechanism of such a machine which serves to square and compress each of the cartons against the enclosed articles prior to setting of the adhesive sealing material.

It is also an object to provide an improved packaging machine with integrated carton forming, filling and sealing mechanisms of the foregoing character which is simple and economical in construction and operation and which is arranged in such a manner as to occupy a minimum of space in a packaging plant where the machine is used.

Other objects and advantages of the invention will become more readily apparent upon reading the following detailed description and upon reference to the drawings, in which:

FIGURE 1 is a perspective view of an illustrative carton blank for use in the novel carton forming, filling and sealing machine of the present invention;

FIG. 2 is a partial end elevation of the carbon blank feeding mechanism and carton forming mechanism of the illustrative machine;

FIG. 3 is a diagrammatic perspective illustration of the carton blank feeding mechanism shown in FIG. 2;

FIG. 4 is an enlarged partial sectional view taken substantially along the line 4—4 in FIG. 3;

FIG. 5 is a vertical section taken substantially along the line 5—5 in FIG. 2 illustrating portions of the carton forming mechanism and the sealing mechanism of the illustrative machine;

FIG. 6 is a horizontal section taken substantially in the plane of 6—6 of FIG. 5 with the carton delivery mechanism moved to the sealing section of the machine;

FIG. 7 is an enlarged fragmentary vertical section taken substantially along the line 7—7 in FIG. 6;

FIGS. 8—13 are perspective views illustrating various stages of folding a carton blank;

FIGS. 14—21 are diagrammatic illustrations showing the operation of the forming mechanism on a carton blank;

FIG. 22 is a perspective illustration of the carton transport mechanism;

FIG. 23 is a vertical section taken substantially along the line 23—23 in FIG. 5 showing the sealing column;

FIGS. 24 and 25 are perspective views of the cartons aligned in the sealing column;

FIG. 26 is a fragmentary sectional view similar to FIG. 23 with parts removed to illustrate a carton moving into the sealing column;

FIGS. 27 and 28 are diagrammatic views illustrating the various dimensional adjustments of the novel packaging machine; and FIG. 29 is a diagrammatic control circuit for the packaging machine.

While the invention will be described in connection with a preferred embodiment, it will be understood that I do not intend to limit the invention to that embodiment, but, on the contrary I intend to cover all alternatives, modifications and equivalents as may be included within the spirit and scope of the invention as defined by the appended claims.

Turning now to the drawings, there is shown an illustrative packaging machine 10 which embodies the present invention. The packaging machine 10 is an integrated machine adapted to perform carton forming, filling and sealing operations to tightly enclose a product indicated at P (FIG. 8) within a slotted carton blank, a preferred form of which is illustrated generally at B in FIG. 1. In the illustrated embodiment, the novel carton forming, filling and sealing machine 10 comprises three basic sections, namely, a carton blank storage and gluing section 11 (see FIGS. 2 and 3), a carton forming section 12 (see FIGS. 2, 5–7 and 14–25), and a carton sealing section 13 (see FIGS. 5, 6 and 23–26). Each of these sections will be dealt with in more detail under separate headings following a more general description of the basic machine 10 and the carton blank B.

As shown in FIG. 1, the preferred form of the carton blank is a flat, substantially rectangular piece of corrugated boxboard or the like which has been provided with a plurality of transverse creases D1–D4 and a pair of longitudinal creases L1 and L2. When the carton blank B is formed by the machine 10, the area to the left of crease line D1, as seen in FIG. 1, becomes the top T of completed box or shipping case C. Similarly, the area to the left of crease line D3 becomes the bottom b and the area to the right of the creases D1, D3 become the respective sides S1 and S2 of the box. Projecting outwardly from crease lines L1, L2, the blank B defines a plurality of end flaps TF, BF, and SF adjacent the respective top, bottom and side portions of the carton blank. To the right of the crease line D4, as seen in FIG. 1, the blank also defines a tab M which cooperates with the top T to form a manufacturer's joint at the top of the completed box C.

Referring more particularly to FIG. 2, a plurality of the creased carton blanks B are placed in a stack S in the carton blank storage section 11 of the illustrative packaging machine 10. From the stack S, each of the blanks B are individually withdrawn by a delivery mechanism in the section 11 and transported under a gluing station indicated generally at 14 to the carton forming section 12 of the machine. Desirably, the gluing mechanism 14 distributes glue to preselected areas of carton blank B as indicated by the spotted areas G in FIG. 1.

As the flat blank B arrives at the forming section 12, a suitable product dispenser indicated at 15 is actuated to place a consolidated group of the articles or product P, which are to be enclosed within the completed box, on the bottom section b of the carton blank B. The product P is released from the dispenser 15, which is then retracted, and the weight of the product serves to force the blank B into the forming mechanism of the section 12 to literally wrap the sides S1, S2 and end flaps SF and BF around the product. The tab M is also turned down over the top of the product by forming mechanism to be described hereafter.

When the above described forming sequence has been completed, the partially formed blank B together with the partially enclosed product P are moved out of the forming section 12 and delivered to the sealing section 13 of the machine 10. Desirably, this movement also serves to turn down the top portion T of the blank over the product P and tab M. The top T is held in this position as the carton continues to move to the sealing section 13.

Once the carton arrives in the sealing section 13 it is squared and elevated by mechanism to be hereafter described into a vertical sealing column c comprising a plurality of the completed shipping cases. As the carton enters the column c, the top end flaps TF are also turned down to complete the formation of the entering case. In the sealing column c, pressure is applied both vertically and horizontally to hold the carton blank firmly against the product for a sufficient period of time for the glue G to set.

During each of the above described gluing, filling, forming and sealing operations on an individual carton blank B, the illustrative machine 10 is also capable of simultaneously initiating or completing the same sequence of operations on other carton blanks which precede and follow such an illustrative blank. In this way, due to the integrated construction and simultaneous operation of the various sections 11, 12, 13, the novel packaging machine 10 rapidly forms the blanks B about the product P and achieves a high volume output of sealed cases C.

*The carton blank storage and gluing section*

As shown in FIGS. 2 and 3, the carton blank storage and gluing section 11 includes a generally rectangular frame 20 supported by suitable legs 21 on a foundation or floor of the packaging room. In the illustrative embodiment, the frame 20 also includes a plurality of vertically aligned guides 22 for accurately aligning and registering the stack S of carton blanks B. The stack of blanks is preferably supported on a pair of horizontal ledges 23 secured to the lower ends of the guides 22.

For removing the carton blank B from the stack S, a pneumatic cylinder is secured to the frame in a generally vertical orientation. The cylinder 25 includes a slidably mounted piston and a piston rod 26 which is coupled to a withdrawing plate 27 having a plurality of vertically disposed suction cups 28 interposed between the plate and the stack of cartons. It will be understood, of course, that vacuum actuated suction tubes could be used in place of the suction cups 28. When an individual carton B is to be removed from the stack, the cylinder 25 is actuated so as to move the piston rod 26 in a downward direction, and the suction cups 28 drawn a single carton blank off the ledges 23 from the bottom of the stack S. As the carton blank is withdrawn, it is intercepted on a plurality of longitudinal slats 29 secured to the frame 20 and the suction cups 28 are pulled away from the blank by the descending withdrawing plate 27.

To deliver the withdrawn carton blank B to the forming section 12, a second air cylinder 30 is utilized to drive a pair of cross shafts 31 and 32 journalled in appropriate bearing blocks 35 mounted on the frame 20. Each of the cross shafts 31 and 32 carries a spocket 36 over which a drive chain 37 is trained. As seen in FIGS. 2 and 3, the actuator 30 includes a piston rod 38 extending entirely through the cylinder and secured at opposite ends to the ends of the drive chain 37. Thus, when the cylinder 30 is actuated in one direction, the piston rod 38 shifts longitudinally pulling the chain 37 so as to rotate the shafts 31 and 32. The cross shafts each mount sprocket wheels 39 adjacent each end thereof with a pair of chains 40 entrained over the respective end sprockets of the two cross shafts. A cross pusher bar 41 is coupled to the chains adjacent the rear portion of the frame 20. Extending forwardly from the pusher bar 41 are a pair of links 42, each of which carries a channel-like bracket 43. As shown in more detail in FIGS. 3 and 4, each of the channel-like brackets 43 is suitably recessed at 44 so as to freely slide along one of the longitudinal slats 29.

From the above, it will be seen that when the cylinder 30 is actuated to urge the piston rod 38 to the right as seen in FIGS. 2 and 3, the cross shafts 31 and 32 are rotated in a clockwise direction and the cross pusher bar 41 is also moved to the right. In this connection, it will be appreciated that the cross pusher bar 41 is moved more rapidly and a greater distance than the piston rod 38 due to the multiplier action afforded by the larger sprockets 39 on the shafts 31, 32. As the cross pusher bar 41 moves to the right, the open channel brackets 43 engage the rear portion of the withdrawn carton blank B which is transported from the dash line position shown in FIG. 3 to the solid line position.

As the carton blank B is longitudinally moved by the pusher bar from the withdrawn position under the stack S, the gluing mechanism 14 is actuated to selectively apply an adhesive to the portions of the carton blank B indicated at G in FIG. 1. Such gluing mechanisms, of course, are well understood in this art, and accordingly, this mechanism is illustrated here in diagrammatic form. Suffice it to say, that the gluing mechanism 14 includes a glue reservoir 47 supported on the frame 20 by means of suitable brackets 48. Beneath the reservoir 47, suitable gluing heads 49 are supported on a linkage 50 coupled to a solenoid 51 which is also mounted on the frame 20. The solenoid 51 is actuated by means of a suitable microswitch 52 adapted to energize the solenoid so as to bring the gluing heads 49 into contact with the carton blank B in order to deposit glue at the indicated portions G.

*The carton forming section*

The carton forming section 12 of the exemplary packaging machine 10 includes a frame 55 supported by a plurality of legs 56 on the packaging room floor. In the preferred embodiment of the carton forming section 12, forming fingers 57 and 58 are supported by and project inwardly from opposite sides of the frame 55. The free ends of the forming fingers 57, 58 support forming die structures 59, 60, respectively, each of which will be discussed in more detail hereafter. As is shown in the diagrammatic illustration of FIG. 3, the forming fingers 57, 58 on each side are equally spaced from the centerline or longitudinal axis x of the path of the carton blank bottom panel b.

For supporting the carton blank B in the carton forming section 12, an air cylinder 62 is mounted on the frame 55 and encloses a piston coupled to a connecting rod 63 on the upper end of which is mounted a support plate 64. As shown in right-hand portion of FIG. 2, the air cylinder 62 is actuated to raise the plate 64 adjacent the tops of the forming fingers 57, 58 when a carton blank B is transported from the carton storage 11 and gluing section 14 of the illustrative machine. Thus, the carton blank is moved over the top of the forming fingers 57, 58 and the plate 64 and is centered with respect to the free ends of the fingers. In this position, it will be apparent that the plate 64 is adapted to support the bottom panel b of the carton blank. The plate 64, of course, is desirably dimensioned somewhat smaller than the bottom portion of the carton blank.

A consolidated group of articles or product P, to be enclosed within the completed case C is placed on the bottom section b of the carton blank by a suitable product dispenser 15 located adjacent the carton forming and filling section 12. Such product dispensers, of course, are well known in this art, and, accordingly, the details of such a device do not form a part of the present invention. Suffice it to say that the illustrative product dispenser 15 includes a guide frame 65 for aligning and centering a group of the product P on the bottom of carton blank B. After the product has been placed on the blank, the frame 65 is retracted and returns to pick up another group of the product.

In accordance with the present invention the weight of the product P is utilized to force the carton blank B through the forming die structures 59, 60 to literally wrap the carton blank about the products P. To this end, the plate 64 supporting the carton blank B and the product P is lowered by bleeding the air from the cylinder 62. As the carton blank B descends, it is engaged and formed by the forming die structures 59, 60 secured to the ends of the forming fingers 57, 58.

Formation of the carton blank B about the product P is diagrammatically illustrated in FIGS. 8–13 which show the forming sequence. As the carton blank begins to descend, the side flaps SF are first engaged by the forming mechanism and turned up as shown in FIG. 8. Continuing downwardly, the sides S1, S2 of the carton blank are engaged by the forming mechanism and begin to turn upwardly as shown in FIG. 9. Subsequently, the end flaps BF adjacent the bottom of the carton are engaged by the forming mechanism and are turned up as shown in FIG. 10. Further downward movement of the carton blank serves to complete the turning in of the end flaps SF and turning up of the sides S1, S2 and the raising of the end flaps BF outside of the end flaps SF. When the carton blank reaches the downward extent of its travel, the blank is formed as indicated at FIG. 12. At that time, the tab M is formed over the top of the product as shown in FIG. 13 by a mechanism to be hereafter described.

Returning to the diagrammatic illustration in FIG. 3, and the right-hand portion of FIG. 2, it will be seen that the forming fingers 57, 58 define camming surfaces 69 and 70, respectively, at their free ends. When the carton blank B is initially centered in the forming section 12, the end flaps SF are disposed over the camming surfaces 69, 70 of the fingers 57, 58. Thus, as the carton blank is lowered due to the weight of the product P, the end flaps SF are turned upwardly by the camming surfaces. The operation of the camming surfaces 69, 70 on the forming fingers 57, 58 in turning up the end flaps SF is, for example, shown in more detail in enlarged illustration of FIG. 7, and in FIGS. 14 and 15.

To turn up the sides S1, S2 of the carton blank, the forming die structures 59, 60 each include forming faces 71 and 72, respectively. The forming faces 71, 72 are preferably mounted on brackets 73, 74 secured to the free ends of the forming fingers 57, 58 with the forming faces 71, 72 disposed slightly below the camming surfaces 69, 70 of the fingers. Thus, as the carton blank proceeds in its downward travel, the forming faces 71, 72 engage the sides S1, S2 of the carton blank and begin to turn the sides upwardly (see FIG. 16). In other words, the forming faces 71, 72 together with the camming surfaces 69, 70 cooperate to form the carton blank as shown in FIG. 9. These camming surfaces and forming faces continue to cooperate to turn the sides S1, S2 and end flaps SF as illustrated in FIGS. 10 and 16, until these respective sides and end flaps are each disposed at right angles to the base b of the carton as shown in FIGS. 11 and 17.

To turn up the end flaps BF as illustrated in FIGS. 10 and 11, each of the forming die structures 59 includes a second forming face 75 secured by a bracket 76 to the free ends of the forming fingers 57. The forming faces 75 are also located below the camming surfaces 69 on the fingers 57 in order to insure that the end flaps BF are not turned up prior to the initial formation of the end flaps SF and sides S1, S2 as shown in FIGS. 10, 11 and 17. In this way, it will be apparent that the end flaps BF will remain outside the end flaps SF as shown in FIGS. 11–13. In the preferred embodiment, the forming faces 75 turn the end flaps BF so that the flaps are substantially at right angles to the bottom b of the carton (see FIGS. 12 and 18). However, it is desirable that a small amount of free space remains between the end flaps BF and the end flaps SF to prevent premature contact of the glued portions G on the flaps BF and the flaps SF.

As the plate 64 descends due to the weight of the product P on the carton blank B to form the blank into the shape shown in FIG. 12 by the action of the camming surfaces 69, 70 and forming faces 71, 72 and 75, a forming mechanism 80 is actuated to turn down the flap M which cooperates to form a part of the manufacturer's joint at the top of the completed case C. In the illustrated embodiment, the forming mechanism 80 comprises a substantially L-shaped arm 81 pivotally mounted at its lower end on a horizontal pin 82 secured to the frame 55.

To operate the forming arm 81, an air cylinder 83 desirably interconnects the frame 55 and the arm 81 at a point above the pin 82. As shown in FIGS. 5 and 19, the forming arm 81 has been rocked forwardly by the cylinder 83 to turn down the tab M on top of the product P.

After the tab M has been turned down by the forming mechanism 80, the partially completed carton C is moved out of the forming section 12 of the illustrative machine and transported to the sealing section 13. For moving the partially completed case C, the illustrative machine 10 includes a transport cylinder 86 mounted on the frame 55. The transport cylinder 86 operates in a similar fashion to the cylinder 30 in the carton blank storage section 11 of the machine. Thus, the cylinder 86 includes a piston rod 87 extending entirely through the cylinder and coupled at its opposite ends to a chain 88. The chain 88 is trained over a pair of sprockets 89 mounted on cross shafts 90 journalled at opposite ends of the frame 55. Each of the cross shafts 90 also mounts an enlarged sprocket 91 for driving a transport chain 92.

As shown in FIG. 7 each of the drive chains 92 is secured to a substantially L-shaped guide bracket 93. The guide brackets 93 preferably snugly engage the back side S2 and ends of the partially completed case C when the plate 64 has been completely lowered. The guide brackets 93 are also supported by means of brackets 94 slidably engaged on rails 95 supported by the machine frame 55. Thus, it will be seen that when the cylinder 86 is actuated to shift the piston rod 87 to the left, the shafts 90 are rotated by the chain and sprocket assembly and the chain 92 drives the guide plates 93 to the right as seen in FIG. 5. In this regard, it will be apparent that the chain 92 moves proportionately faster and farther than the chain 88 due to the multiplier action of the larger sprockets 91.

As the guide plates shift the partially completed carton C off the support plate 64, the bottom b of the carton is intercepted and supported on a plurality of longitudinal slats 96. At the same time, the top T of the carton blank B is turned down by the undersides of the forming faces 71, 72. In this connection it will be understood that the top T of the carton blank is turned down over the upper end of the forming arm 81 so that as the partially completed carton C moves out from under the forming arm the top will intercept and hold down the flap M.

Turning now to FIG. 20 the initial movement of the partially completed case C by the guide plates 93 is illustrated together with the initial downward turning of the top portion T by the underside of the forming faces 71, 72. Continued movement of the case C out of the forming section 12 is shown in FIG. 21 wherein the top flap T has been pressed down by the forming faces 71, 72 over the top flap M, thus completing the forming action on the carton blank in the forming section 12.

FIG. 22 diagramatically illustrates a perspective view of the transport mechanism for moving the partially completed case C from the forming section 12 to the sealing section 13 of the illustrative machine. As shown here, the guide plates 93 have been moved away from the supporting plate 64 by the drive chains 92. In this connection it will also be understood that the space provided between the two guide plates 93 permits the transport mechanism to move back itno the forming section 12 after the plate 64 has been raised by the air cylinder 62 and connecting rod 63.

The carton sealing section

The carton sealing section 13 of the illustrative machine 10 is organized generally along the lines illustrated in Midnight Patent No. 2,904,941. Thus, the present sealing mechanism 13 includes a lower section 101 and an upper section 102. The lower section 101 preferably extends upwardly from the frame 55 supporting the transport mechanish including the drive chains 92. Thus, it will be appreciated that the partially completed cartons C are delivered from the forming section 12 of the machine to the lower section 101 of the sealing section 13.

Returning now to FIGS. 5 and 6, it will be seen that the illustrative machine 10 includes a hold-down plate 103 spaced from and parallel to the longitudinal slats 96. The hold-down plate 103 serves to maintain the top T of the partially completed carton in engagement with the flap M as the case moves to the lower section 101 of the sealing section 13. In the preferred embodiment, the hold-down plate 102 is pivotally mounted adjacent its rear end on the lower section 101 and is supported at its forward end from the sealing mechanism such as by a chain 104.

The upper section 102, as in the above mentioned patent, includes a carton ejector mechanism 105 having an ejector head 106 adapted to bear against the uppermost carton or case in the sealing column so as to exert a lateral thrust against the end or side of the carton for positively discharging the carton from the top of the column. It will be understood that the cartons can then be carried by a suitable overhead conveyor system or other mechanism to a loading station or the like.

To elevate the partially completed case C into the sealing column, an air cylinder 110 is mounted on the frame 55 in alignment with the axis of the sealing column. The cylinder 110 includes a piston and piston rod 111 secured to a supporting plate 112 which, in its lowered position is disposed adjacent the ends of the horizontal slats 96. Thus, as a carton is delivered by the guide frames 93 along the slats 96 it is pushed onto the support platform 112 for elevation into the sealing column. The partially completed carton C appears substantially in the form illustrated in FIG. 24 when it arrives at the sealing column.

To insure that the carton blank B firmly encloses the product P, the guide plates 93 carry the partially completed carton C sufficiently far to the right as seen in FIG. 5 that the side S1 of the carton abuts a squaring plate 115. This positive pressure exerted on the sides S1, S2 insures that the sides firmly engage the product P prior to sealing of the top T. It will also be understood from the illustration in FIG. 23 that since the end flaps TF have not yet been turned down over the end flaps SF, the sides S1, S2 may be conveniently urged together.

While pressure is still being exerted on the carton sides S1, S2 the lifting cylinder 110 is actuated to raise the carton into the sealing column. As the carton is raised, the end flaps TF are formed down by a pair of camming members 116 disposed at the entrance end of the sealing column. The entering carton thus appears as shown in FIG. 25. In the preferred embodiment, the forming members 116 are each mounted on depending links 117 pivoted at their upper ends by pins 118 journalled on the lower portion of the column framework 101. Thus, as the case C rises, the forming members 116 plow down the end flaps TF and the formers are spread so that the top T of the entering carton is urged upwardly against the bottom of the lowest carton in the sealing column (see FIG. 26). The lift cylinder 110 continues upwardly until the entering carton C is above a ledge portion 119 formed on each of the members 116.

To hold the cartons in the sealing column, the ledges 119 on the forming members 116 are adapted to snap under the bottom of the entering carton. For this purpose, each of the suspended links 117 is biased toward the center of the sealing column by means of a suitable spring 120. The lift cylinder 110 is then actuated to lower the support plate 112 back to the position shown in FIG. 5. It will be understood, of course, that the plate 112 is dimensioned to fit freely between the formers 116 when they are disposed at their innermost position.

Once a carton C has entered the sealing column, it will be apparent that the weight of the filled cartons above the lowest carton serve to exert a substantial pressure on the top T to seal it against the flap M. In this regard, the sealing mechanism 13 of the present invention is substantially the same as disclosed in the above mentioned Patent No. 2,904,941.

Pursuant to another aspect of the present invention, pressure is exerted against the end flaps TF, BF of the carton in the sealing column to firmly seal these flaps against the inner end flaps SF. End pressure is applied to the cartons in the sealing column by means of a pair of end plates 121 and 122 which also guide the vertical movement of the cartons through the column. End plate 122 is preferably carried by a pair of fluid actuators or air cylinders 123 having piston rods 124 secured to the plate. Thus, when the cylinders 123 are supplied with air pressure, end plate 122 urges the carton against end plate 121 and serves to square the carton C in the column and also maintain sufficient pressure on the ends of the carton to permit the glued portions to become firmly set.

From the above discussion of the integrated sections 11, 12 and 13 of the illustrative packaging machine 10, it will be apparent that each of the carton blanks B are sequentially withdrawn from the stack S and, after being glued, are firmly wrapped about the product P. The partially formed cases C are subsequently completed and then squared and sealed in the column c. By tightly wrapping and firmly sealing the carton blanks about the product in this manner, substantially all of the free space within the carton C is filled by the product. Accordingly, the individual articles or product can be shipped without the usual danger of breakage due to the individual packages shipped within the completed cartons C.

*Adjusting means*

Pursuant to another feature of the present invention, the illustrative packaging machine 10 can easily form, fill and seal carton blanks into shipping cases having varying horizontal and vertical dimensions. As previously mentioned, the carton forming section 12 in the preferred embodiment is located on the center line or axis x of the delivery path of the carton blank bottom b. Moreover, the forming fingers 57, 58 supported by and projecting inwardly from the frame 55 are equally spaced from the center line x of the delivery path of the carton bottom b. The free ends of the forming fingers 57, 58 are also desirably equally spaced from the center line or axis y of the transport path of the partially completed cartons C. In other words, the carton forming section 12 is located at the intersection of the delivery path x and the transport path y of the illustrative machine. This relationship is diagrammatically illustrated in FIG. 28.

In order to accommodate cartons of varying horizontal dimensions, i.e., length and width, it is only necessary to adjust the spacing of the forming fingers 57, 58 from the respective axes y and x. To this end, each pair of forming fingers 57, 58 is desirably mounted on a supporting carriage 125 at opposite sides of the machine frame 55. Each carriage 125 is mounted for adjustable movement with respect to the axis y, and each of the fingers 57, 58 are adjustably mounted on the carriages 125 for movement toward and away from the axis x.

In the preferred embodiment, movement of both carriages 125 is simultaneously affected by suitable adjusting screws 126, all of which are interconnected by a chain and sprocket driving connection that may be operated by a suitable crank or the like (not shown). Similarly, the fingers 57, 58 are simultaneously moved on each of the carriages 125 by screws 127 having oppositely threaded ends which are rotatable by hand cranks 128 and gears 129 or the like.

To accommodate cartons of varying vertical dimensions, the illustrative machine 10 includes a subframe 130 adjustably mounted on the frame 55. The subframe 130 supports the carton transport mechanism including the cross shafts 90, drive chains 92, guide brackets 93, rails 95, and slats 96 from the main frame 55. The subframe 130 is adjustably mounted for vertical movement with respect to the frame 55 by means such as supporting screws 131 located adjacent each corner of the two frames 55, 130. Thus, by rotating the screws 131, the subframe 130 including the slats 96 may be vertically adjusted with respect to the frame 55, the top formers 71, 72 and the hold-down plate 103. This relationship is diagrammatically illustrated in FIG. 27.

In the preferred embodiment of the machine 10, all of the vertical adjusting screws 131 are interconnected by a common driving means. As shown in more detail in FIGS. 5–7, each screw 131 includes a bevel gear 132 driven by another bevel gear 133 mounted on a cross shaft 134. The cross shafts 134, located at opposite ends of the frame 55, are coupled together by a drive chain 135 and sprockets 136 respectively mounted on each shaft. One of the shafts 13a is preferably formed with a square end 137 that can be turned by an appropriate wrench, crank or the like (not shown). Thus, it will be understood that when the end 137 of one screw 131 is rotated, the three remaining screws are similarly rotated by the chain and sprocket and bevel gear driving connections to vertically adjust the subframe 130 with respect to the main frame 55.

*Control circuit*

The control circuit for the illustrative packaging machine 10 is diagrammatically illustrated in FIG. 29. In order to more conveniently associate the various control components shown in FIG. 29 with the respective carton blank storage and gluing section 11, carton forming section 12, and carton sealing section 13 of the integrated packaging machine 10, these sections have been indicated by dash-line segments. In the preferred embodiment, a pneumatic control system is utilized since a source of pressurized air is commonly available in most packaging plants. It will be understood, however, that other supply sources such as oil pressure or electricity may also be employed without departing from the present invention. In the event electrical energy is utilized, the various fluid actuators and controls shown in FIG. 29 would, of course, be replaced by suitable electrical actuators and control components.

In the illustrated embodiment, pneumatic pressure is supplied to the various control components of the machine 10 through a supply line 140 coupled to a conventional pneumatic pressure source (not shown) in the packaging plant. The supply line 140 preferably includes an air filter 141 and an oiler 142 disposed on opposite sides of a pressure regulator valve 143 in the supply line. The filter 141 and oiler 142, of course, serve to pick up any dirt or foreign matter carried by the pressurized air and to lubricate the air being delivered to the control components. The pressure regulator valve 143 permits the operation of the packaging machine control system at a uniform pressure below the pressure at the source and without variations due to pressure drops at other points in the packaging plant.

As heretofore mentioned, the details of the product dispensing mechanism of the illustrative machine do not form a part of the present invention. For the purposes of illustration, however, a suitable dispensing actuator 150 has been illustrated in FIG. 29 for delivering a consolidated group of the product P to the carton forming section 12 of the packaging machine. It will be understood that the actuator 150 may be of any convenient form for operation with its associated product grouping and consolidating mechanism. In the present instance, it will be seen that the actuator 150 is in the form of an air cylinder having a connecting rod 151 extending therethrough. The connecting rod 151 carries a suitable camming mechanism 152 for actuating a bleeder valve bv–1 as the actuator places a group of the product on a carton blank in the forming section of the machine.

As shown in FIG. 29, the principal actuators in the control system for the novel packaging machine 10 are a plurality of double acting air cylinders including: carton blank withdrawing cylinder 25, the carton supporting cylinder 62, the forming cylinder 83, the carton blank delivery cylinder 30, the carton transport cylinder 86, the carton elevating cylinder 110 and the carton ejecting cylinder 105; and two single acting end pressure air cylinders 123. The principal actuators are controlled by a plurality of four-way control valves V-1, V-2, V-3, V-4 and V-5, each of which communicate with the air pressure supply line 140. The control valves V-1–V-5 are also provided with reversible pressure-exhaust lines at their opposite ends which communicate with the respective actuators.

In the preferred embodiment the control valves V-1, V-3, V-4, and V-5 are each pneumatically balanced so that the reversible pressure-discharge lines are blocked until the pressure on one side of the control valve is relieved by a suitable bleeder valve. Thus, when the pressure is relieved from the right hand side of each of these valves as seen in FIG. 29, the line connecting one end of the actuator and the left hand side of the control valve becomes a pressure line and the line connecting the opposite end of the actuator and the right hand side of the valve becomes an exhaust line. Conversely, when the pressure is bled from the left hand side of the control valves, the right hand actuator line becomes pressurized and the left hand actuator line is exhausted. In the present instance, the actuator lines are exhausted through the control valves to the atmosphere although a common exhaust line or manifold could be incorporated for the valves.

In the preferred arrangement, the construction and operation of control valve V-2 differs somewhat from the other control valves in that the spool of this valve is spring returned. In other words, only one side of valve V-2 is coupled to a bleeder valve and when the bleeding is stopped, the spring returns the spool in the opposite direction to pressurize the right hand actuator line as seen in FIG. 29.

The operation of the control system may now be described as follows beginning with the placement of a group of articles or product P on the bottom $b$ of a flat carton blank B in the forming section 12 of the machine 10. The cam 152 actuates bleeder valve $bv$–1 to exhaust air from the left side of control valve V-1 thereby discharging the air from the lower portion of support cylinder 62 and allowing the support plate 64 and the carton blank to lower into engagement with the forming mechanism. As the plate 64 and carton blank descend to the bottom of the forming section 12, a second bleeder valve $bv$–2 is actuated to exhaust air from the right side of control valve V-2 thereby pressurizing the line coupled to the rear portion of the forming actuator 83. The forming arm 81 is thus rocked about its pivot 82 by the pressurization of actuator 83 by the air flowing through valve V-2 from the supply line 140. At the same time pressure is communicated to the upper end of the withdrawing cylinder 25 to lower the plate 27 and suction cups 28 to withdraw the lowermost carton blank B from the stack S in the carton storage section 11 of the machine.

The rocking movement of forming arm 81 by actuator 83 to turn down the top sealing tab M of the partially completed carton in the forming section 12 also actuates a third bleeder valve $bv$–3. This bleeder valve $bv$–3 exhausts air from the left side of control valve V-3 thereby communicating pressurized air from the supply line 140 to the right hand ends of both the transport cylinder 86 and the delivery cylinder 30. Movement of the connecting rod 38 to the left drives the chain and sprocket drive mechanism to deliver the withdrawn carton blank to the forming section 12. Similarly, movement of the connecting rod 87 to the left drives the transport mechanism including the transport chains 92 to move the partially completed carton C out of the forming section 12 and into the sealing section 13 of the machine.

The initial movement of the carton out of the forming section 12 releases bleeder valve $bv$–2 which permits the spring biased control valve V-2 to return the forming arm 81 to its retracted position and the withdrawing plate 27 and suction cups 28 to their original positions, gripping the lowermost carton blank in the stack S. Movement of the arm 81, of course, releases bleeder valve $bv$–3 restoring the balanced condition of control valve V-3. But this takes place only after the new carton blank is delivered to the forming section 12 and the partially completed case is moved to the sealing section 13.

The movement of the partially completed carton out of the forming section 12 also actuates bleeder valve $bv$–4 coupled to the other side of the first control valve V-1 to pressurize the lower end of support cylinder 62 thereby raising the support plate 64 after the carton has cleared the forming section. It will be understood, of course, that the dispensing actuator 150 has, in the meantime, been actuated to pick up another group of product P and bleeder valve $bv$–1 is thus released. Subsequent movement of the carton C by the transport chains 92 releases bleeder valve $bv$–4 thereby returning control valve V-1 to balanced condition.

As the partially completed carton C is moved into the sealing section 13 and against the squaring plate 115, bleeder valve $bv$–5 is actuated bleeding the right side of control valve V-4 thereby permitting pressurization of the lower side of elevating cylinder 110. At the same time, the pressure at the upper end of the elevating cylinder 110 and the pressure in the compression cylinder 123 is exhausted. Cylinder 110 then urges the carton C through the forming members 116 at the entrance end of the sealing column.

Upward movement of the carton C through the sealing column then actuates bleeder valve $bv$–6 to bleed the right side of control valve V-3 which returns the carton blank delivery mechanism and carton transporting mechanism to their original positions. Further upward movement of the carton C in sealing column actuates bleeder valve $bv$–7 to terminate the operation of lift cylinder 110 after the carton C has progressed above the ledge portions 119 which snap beneath the carton to hold it in the sealing column. Elevating cylinder 110 is thereby lowered to its initial position adjacent the ends of the horizontal slats 96 ready to receive the next partially completed carton, and the end compression cylinders 123 are again pressurized.

Simultaneously with the actuation of bleeder valve $bv$–7 another bleeder valve $bv$–8 is actuated for discharging the uppermost carton from the top of the sealing column. Bleeder valve $bv$–8 causes control valve V-5 to admit pressure to the right hand portion of ejector cylinder 105 thereby urging the ejector head 106 to the left as seen in FIG. 29. Movement of the ejector head 106 to its left hand position, in turn, actuates another bleeder valve $bv$–9 by means of a cam 153 which returns the ejector mechanism to its original position, and thereby completing one operation cycle.

As previously mentioned, the main actuators 25, 30, 62, 83, 86, 105 and 110 are all double acting air cylinders adapted to do work in two directions. However, in each case the principal work is done in one direction and the movement in the other direction is by and large simply a return stroke. Accordingly, a smaller pressure is required to actuate these cylinders in the return stroke. Therefore, the preferred embodiment of the control system includes a plurality of pressure regulators 155 and check valves 156 in the pressure-exhaust lines to the actuators 25, 30, 62 and 86. By setting the regulators 155 at a pressure just above that which is required for the actuator to do the necessary work, a considerable saving in air pressure is achieved in the control circuit. It will be understood that pressurized air flows through the regulators 155 to the actuators and exhaust air bypasses the regulators by flowing from the actuators through the check valves.

To permit faster movement of the elevating cylinder 110 and the ejection cylinder 105 for both the work stroke and the return stroke, rapidly opening gate valves 157 have been installed on the work lines of these actuators.

In addition, quick exhausting valves 158 are desirably installed in both the reversible pressure-exhaust lines of these two actuators so that as soon as the pressure in these lines falls off due to operation of the respective control valves V-4 and V-5, the pressure is exhausted to the atmosphere. This arrangement permits faster bleeding of the exhaust sides of these actuators since the exhaust air does not have to return through the check valves, exhaust lines and control valves to the atmosphere. Depending on the particular installation, similar gate valves and quick exhaust valves may be advantageously installed for the other main actuators.

I claim as my invention:

1. In a packaging machine for wrapping a substantially flat, preslotted and creased carton blank having top, bottom and side portions with end flaps adjacent thereto and a top sealing tab, around a product to be enclosed in the carton, the combination comprising,
   a forming section having a guide frame disposed thereabove for aligning and centering a consolidated group of articles on the carton blank,
   a support for the carton blank and the articles loaded thereon,
   means positioning a flat carton blank onto said support plate in vertical alignment with said guide frame,
   means delivering a consolidated group of articles in said guide frame onto the carton blank on said support,
   a plurality of forming faces at different levels, for engaging the sides and end flaps of the carton blank adjacent the bottom of the carton blank and along the sides of the downwardly moving product,
   retractable support means for said support including fluid pressure cylinder and piston means disposed beneath said support,
   and valve means releasing pressure from said cylinder and piston means to accommodate the weight of the product on said carton blank to move said carton blank downwardly along said forming faces at a controlled rate to first turn up said end flaps adjacent said sides and then said side portions around the product.

2. The structure of claim 1,
   wherein means are provided for transporting the partially formed carton and product therein from said forming section for sealing,
   and wherein additional forming means are disposed in the path of movement of said carton and the consolidated product partially enclosed therein from said forming section for sealing, to turn down a top portion of the carton blank over said product.

3. The structure of claim 2,
   wherein a forming arm is disposed beneath said forming faces,
   and wherein means are provided to move said forming arm toward the carton to turn down a top sealing tab over the product and to engage the top sealing tab and maintain said tab down, to thereby accommodate said additional forming means to turn down the top portion of the carton over said tab for transportation of the carton from said forming section for sealing.

4. The structure of claim 2,
   wherein the forming faces are camming faces on the ends of individual forming fingers extending inwardly of the margins of said guide frame and include end and side forming faces and disposed in different planes to effect sequential forming of the carton about the product during lowering movement thereof by the weight of the product.

5. In a packaging machine for wrapping a substantially flat, preslotted and creased carton blank having top, bottom and side portions with end flaps adjacent thereto and a top sealing tab around a product to be enclosed therein, the combination comprising,
   a carton forming section having a plurality of forming faces for engaging said sides and said end flaps adjacent said sides and bottom of said carton blank,
   means for positioning said flat carton blank over said forming section with said bottom portion centered with respect to said forming faces,
   dispensing means for placing a consolidated group of the product to be enclosed in said carton blank on said bottom portion thereof whereby the weight of said product urges said carton blank downwardly into engagement with said forming faces,
   said forming faces adapted to first turn up said end flaps adjacent said sides then said sides around said product,
   said forming faces adapted to subsequently turn up said end flaps adjacent said bottom over and around said end flaps adjacent said sides,
   transportation means for laterally transporting said carton and partially enclosed product out of said forming section,
   additional forming means disposed in the path of movement of said carton and partially enclosed product to turn down the top portion of said carton over said product,
   said transporting means including,
       a pair of spaced apart, substantially L-shaped guides adapted to receive one side and a portion of each end of the partially formed carton,
       and means for horizontally reciprocating said guides, from the forming section to the sealing section whereby the partially formed carton is laterally moved therewith.

6. The combination defined in claim 5,
   wherein the transporting means also includes a plurality of substantially horizontal slats along which said carton is moved from the forming section to the sealing section, and means are provided for vertically adjusting said slats with respect to the additional forming means whereby cartons of varying vertical dimensions can be formed.

7. An integrated packaging machine comprising, in combination,
   a carton blank storage section adapted to removably support a stack of substantially flat preslotted and creased carton blanks,
   withdrawing means having supporting engagement with the bottom blank of a stack of blanks and operable to withdraw individual blanks from the bottom of said stack,
   support means for the withdrawn blank,
   feeding means for feeding the withdrawn blank for forming,
   gluing means disposed adjacent said stack of carton blanks on the outgoing side thereof,
   sensor means engaged by a moving carton blank during feeding thereof from said storage section and effective to actuate said gluing means to deposit adhesive on preselected areas of said carton blank,
   a carton blank forming section spaced from said gluing means in alignment with said storage section and having a plurality of forming faces engaging selected portions of the carton blank,
   supporting means for supporting a carton blank in said forming section,
   product dispensing means in association with said forming section for placing a consolidated group of articles on the bottom area of said carton blank,
   said supporting means for the carton blank in said forming section being releasable to accommodate downward movement of said supporting means and the carton blank supported thereon by the weight of the consolidated group of articles on said carton blank, and accommodating the consolidated group of articles to move said carton blank along said forming faces to wrap the sides and end flaps of the carton blank upwardly along the group of consolidated articles.

8. The structure of claim 7,
wherein the storage section includes an open bottom rectangular enclosure having at least two inwardly extending ledges supporting opposite edges of a carton blank,
wherein suction devices have supporting engagement with the bottom carton blank,
wherein a fluid pressure cylinder and piston having a piston rod extensible therefrom has supporting connection with said suction devices,
and wherein said fluid pressure and cylinder and piston is operable to hold said suction devices in position and to lower said suction devices beneath said feeding means, to deposit a flat carton blank onto said feeding means.

9. The structure of claim 8,
wherein at least two laterally spaced horizontally extending slats are disposed beneath said storage section and said suction devices when supporting the bottom carton blank of a stack of carton blanks,
wherein said suction devices are movable beneath said slats to deposit a carton thereon,
and wherein power operated pusher means movable along said slots are provided to feed a carton blank along said slats for gluing and forming.

10. The structure of claim 7,
wherein the forming section includes a vertically movable plate at the delivery end of the feeding means for supporting a carton blank thereon and a consolidated group of articles loaded thereon,
wherein a fluid pressure operated cylinder and piston forms a support for said plate and is operable to hold said plate in an elevated position,
and wherein means are provided for releasing pressure from said cylinder and piston, to accommodate the weight of the consolidated group of articles to lower the carton blank along said forming faces and wrap the sides and end flaps of the carton blank about said articles.

11. The structure of claim 10,
wherein the forming faces for the sides of the carton are at a different level than the forming faces for the ends of the carton to effect the successive turning up of the ends and sides of the carton,
and wherein the forming faces comprise camming faces on the ends of individual forming fingers extending inwardly of the margins of the carton blank.

12. The structure of claim 7,
wherein the forming faces for the sides of the carton are at different levels than the forming faces for the ends of the carton, to successively turn up the ends and sides of the carton upon downward movement of the loaded carton blank by gravity,
wherein a carton sealing section is spaced from said carton forming section,
wherein carrier means are provided for transferring the partially formed carton blank to said sealing section,
wherein a movable forming arm is disposed beneath said forming faces at the limit of downward travel of a loaded partially formed carton for turning down a top sealing tab over the carton blank and to maintain said tab down,
and wherein additional forming means extend from said sealing section above said carrier means toward said forming section, for turning down the top portion of the carton blank over the articles therein and over said top sealing tab.

13. The structure of claim 12,
wherein the top portion of the carton blank has end flaps extending from opposite sides thereof,
wherein support means are provided at said sealing section for elevating the loaded carton,
and wherein forming means are provided at said sealing section for turning down said end flaps during vertical movement of the loaded carton, and completing the enclosure for the consolidated group of articles.

References Cited

UNITED STATES PATENTS

| | | | |
|---|---|---|---|
| 1,295,951 | 3/1919 | Armstrong | 53—222 X |
| 1,603,879 | 10/1926 | Smith et al. | 53—208 X |
| 1,814,166 | 7/1931 | Kux | 53—230 |
| 2,096,278 | 10/1937 | Huebsch et al. | 53—222 X |
| 2,125,024 | 7/1938 | Houpt | 53—222 |
| 2,152,330 | 3/1939 | Shafer | 53—207 |
| 2,270,264 | 1/1942 | Carruth | 53—47 |
| 2,904,941 | 9/1959 | Midnight | 53—387 X |
| 2,965,369 | 12/1960 | Acker et al. | 198—221 X |
| 2,989,774 | 6/1961 | Erickson et al. | 198—221 X |
| 3,105,334 | 10/1963 | Marshall | 53—376 X |
| 3,145,518 | 8/1964 | Ricca | 53—376 X |
| 3,200,555 | 8/1965 | Liedtke | 53—231 X |

FOREIGN PATENTS 742,745   12/1943   Germany.

TRAVIS S. McGEHEE, *Primary Examiner.*

FRANK E. BAILEY, *Examiner.*

L. S. BOUCHARD, *Assistant Examiner.*